United States Patent
Verreault

(10) Patent No.: US 7,366,193 B2
(45) Date of Patent: Apr. 29, 2008

(54) SYSTEM AND METHOD FOR COMPENSATING PACKET DELAY VARIATIONS

(75) Inventor: Eric Verreault, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 941 days.

(21) Appl. No.: 10/308,990

(22) Filed: Nov. 27, 2002

(65) Prior Publication Data

US 2003/0235217 A1    Dec. 25, 2003

(30) Foreign Application Priority Data

Nov. 29, 2001   (CA) .................................. 2364091

(51) Int. Cl.
*H04L 12/28* (2006.01)
(52) U.S. Cl. ........................ 370/412; 710/52; 710/58
(58) Field of Classification Search ................. 370/412, 370/229, 230–239
See application file for complete search history.

(56) References Cited

U.S. PATENT DOCUMENTS

| | | | |
|---|---|---|---|
| 5,875,175 A | 2/1999 | Sherer et al. | |
| 6,172,972 B1 | 1/2001 | Birdwell et al. | |
| 6,252,851 B1 | 6/2001 | Siu et al. | |
| 6,259,677 B1 | 7/2001 | Jain | |
| 6,389,032 B1 * | 5/2002 | Cohen | 370/412 |
| 7,047,308 B2 * | 5/2006 | Deshpande | 709/232 |
| 2001/0024435 A1 | 9/2001 | Birdwell et el. | |

OTHER PUBLICATIONS

Steinbach, E., et al., "Adaptive Playout for Low Latency Video Streaming," Proceedings 2001 International Conference on Image Processing, Greece, Oct. 2001, pp. 962-965.
Laoutaris, N., et al., "Adaptive Playout Strategies for Packet Video Receivers with Finite Buffer Capacity," 2001 IEEE International Conference on Communications, Finland, Jun. 2001, pp. 969-973.
Yuang, M., et al., "Dynamic Video Playout Smoothing Method for Multimedia Applications," 1996 IEEE International Conference on Communications (ICC) Converging Technologies for Tomorrow's Applications, Dallas, TX, Jun. 1996, pp. 1365-1369.
Supplementary European Search Report for EP 02 78 4627, dated Mar. 16, 2005.

* cited by examiner

*Primary Examiner*—Duc Ho
(74) *Attorney, Agent, or Firm*—Merek, Blackmon & Voorhees, LLC

(57) ABSTRACT

A system improves reconstruction of real-time data in a packetized network. The system includes the following elements. A play-out buffer receives packets from the network. A playback element, coupled with the play-out buffer, retrieves packets from the play-out buffer and outputs data for the reconstruction of real-time data. A time adjuster alters the rate at which the data is output in accordance with the availability of the packets.

20 Claims, 5 Drawing Sheets

SYSTEM AND METHOD FOR COMPENSATING PACKET DELAY VARIATIONS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to data streaming in packetized networks, specifically to a system and method for compensating for delay variations for continuous time signals transported over such networks.

A packet is a unit of data that is routed between an origin and a destination on a packet-switched network, such as the Internet. In a system that uses packets, data to be transmitted is separated into packets having a predefined size. The packets are assigned an identification number and a destination address, and are transmitted over the network. Once the packets arrive at the destination, their data portions are reassembled to recreate the originally-transmitted data. However, due to a variety of end-to-end delays (such as alternate data paths, for example), the packets do not necessarily arrive in the order in which they were transmitted. Thus, the packets cannot simply be reassembled as they are received. A solution to this problem is to buffer the packets as they are received. The larger the buffer, the more leeway a packet has in arriving at its destination on time. Once the packets are received, they are then reassembled in the appropriate order in accordance with their identification number.

In applications where continuous time signals are packetized, the packets are typically buffered at the receiving site and their play-out is delayed in order to compensate for the variations of the network end-to-end delays. As previously described, the buffer introduces an additional delay that allows the system to hold packets scheduled to be played-out later in time. Thus, it offers a time window over which the network end-to-end delay can vary. In the case of a non real-time application, such as audio or video streaming, the selected delay introduced by the buffer is, by design, typically set to a very large size. Such a large size minimizes the probability of receiving late packets.

However, in the case of a real-time application like video conferencing or audio conversation, large delays impair the usability of the system. Large delays in real-time applications are contrary to concept of "real-time", wherein information is effectively delivered immediately. Thus it is preferable that the delay introduced by the buffer is minimized. However, having a smaller buffer increases the risk of losing packets if the delay of the packet arrival is greater than that provided by the buffer. Therefore, it has become an art to select a delay such that the probability of a late packet arrival is low enough that it is acceptable.

In present solutions to this problem, the size of the buffer is adjusted in accordance with arrival rate of the packets. For example, if the selected delay is observed to be too small, the buffer is increased to minimize the number of late packets. Conversely, if the selected delay is observed to be too large, the buffer is decreased to make the system appear more transparent. However, a reduction in the delay can create excess packets. Similarly, an increase in the delay can create gaps in the play-out.

Two approaches are commonly used to set the delay referred to above. Either the delay is set once for the whole session, or it is adjusted dynamically between talkspurts. A talkspurt is generally defined as a collection of packets whose data contains a continuous portion of a sound signal. In both cases, everything is done to avoid adjusting the delay during a non-silence period. It has been shown that adjusting the delay on a per-packet basis, that is, within the talkspurt, introduces gaps and slips that are damaging to the quality of the audio.

Therefore, there is a need for a system and method for reducing the excess discarding of packets and minimizing gaps when the play-out delay is adjusted. It is an object of the present invention to obviate or mitigate at least some of the above-mentioned disadvantages.

BRIEF SUMMARY OF THE INVENTION

In accordance with an aspect of the present invention, there is provided a system for improving reconstruction of real-time data in a packetized network. The system includes the following elements. A play-out buffer receives packets from the network. A playback element, coupled with the play-out buffer, retrieves packets from the play-out buffer and outputs data for the reconstruction of real-time data. A time adjuster alters the rate at which the data is output in accordance with the availability of the packets.

BRIEF DESCRIPTION OF THE DRAWINGS

An embodiment of the invention will now be described by way of example only with reference to the following drawings in which.

DETAILED DESCRIPTION OF THE INVENTION

Figure 1:
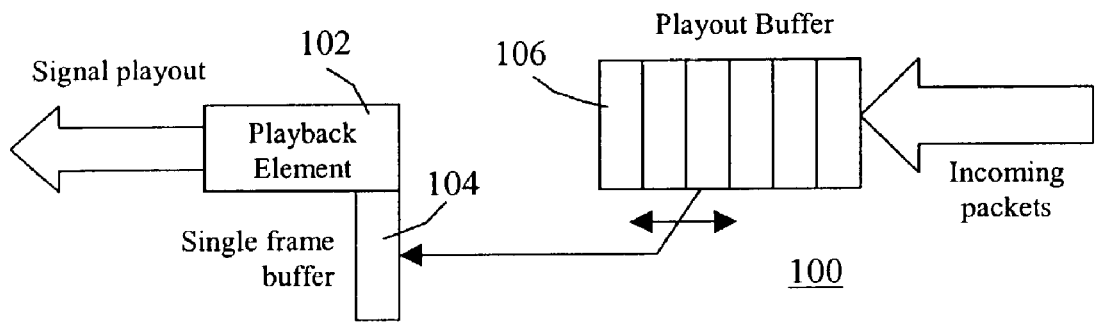
FIG. 1 is block diagram of a playback system in accordance with the prior art.

For convenience, like numerals in the description refer to like structures in the drawings. Referring to FIG. 1, a prior art playback system is illustrated generally by numeral 100. The playback system 100 comprises a playback element 102, a single frame buffer 104, and a play-out buffer 106. The play-out buffer 106 is coupled between a network (not shown) and the single frame buffer 104. The single frame buffer 104 is further coupled to the playback element 102.

The operation of the system illustrated in FIG. 1 is described as follows. Incoming packets from the network are received and their content is inserted into the play-out buffer 106. The play-out buffer 106 provides the time delay necessary to eliminate the end-to-end delay variations of the network. A voice frame is periodically extracted from the play-out buffer 106 in accordance with a predefined play-out delay and inserted into the single frame buffer 104. The voice frame carried over the network can be in a compressed form or a direct sample-per-sample digitized representation. The playback element 102 recreates the original waveform.

Figure 2:
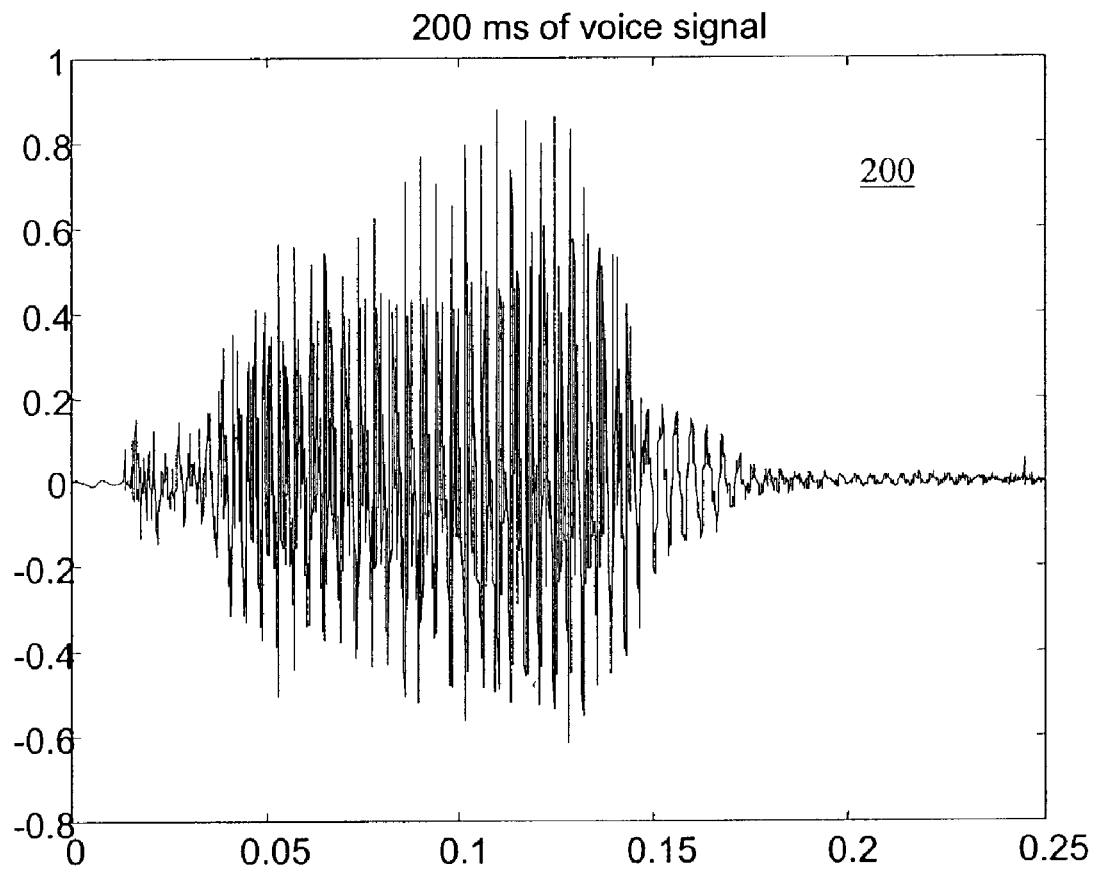
FIG. 2 is a waveform of a 200 ms voice sample.

Referring to FIG. 2, an example of a typical original signal is illustrated generally by numeral 200. The signal 200 illustrates amplitude evolution over a quarter of a second of a spoken word. If the play-out buffer 106 is properly defined and there are no unexpected delays, the original signal will be reproduced as illustrated in FIG. 2. However, since in reality the delays are changing constantly, the play-out buffer 106 is changing regularly.

Figure 3:
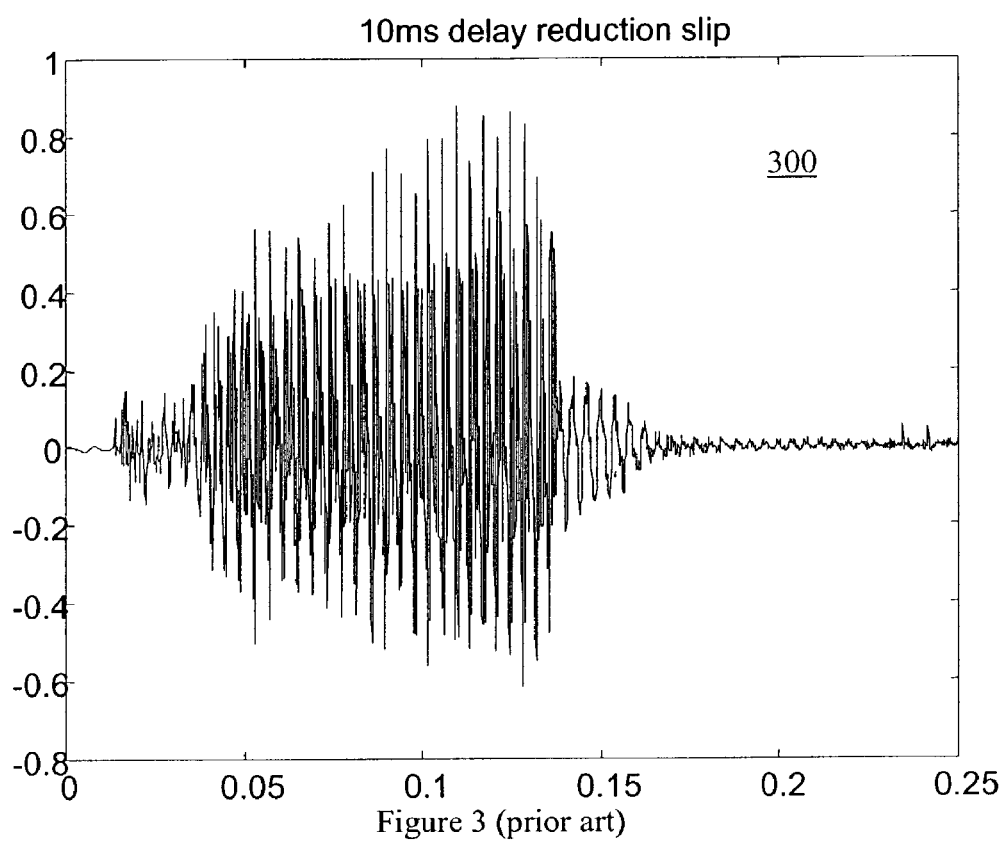
FIG. 3 is a waveform illustrating a 10 ms decrease in the buffer of the system illustrated in FIG. 1.

As previously described, it is preferable that the play-out buffer is minimized to improve the "real-time" aspect of the system. However, if the play-out buffer is changed such that a 10 ms delay reduction occurs and the packets arrive faster than expected, then some packets will be dropped. Referring to FIG. 3, a signal reproduced under these circumstances is illustrated generally by numeral 300. As can be seen in the reproduced signal, an adjustment occurs approximately 0.13 s into the signal. Data from the original signal 200 contained in the dropped packets is missing from the reconstructed signal 300 and it can be observed that the waveform suffers from a rapid drop in the decaying overall envelope.

Figure 4:
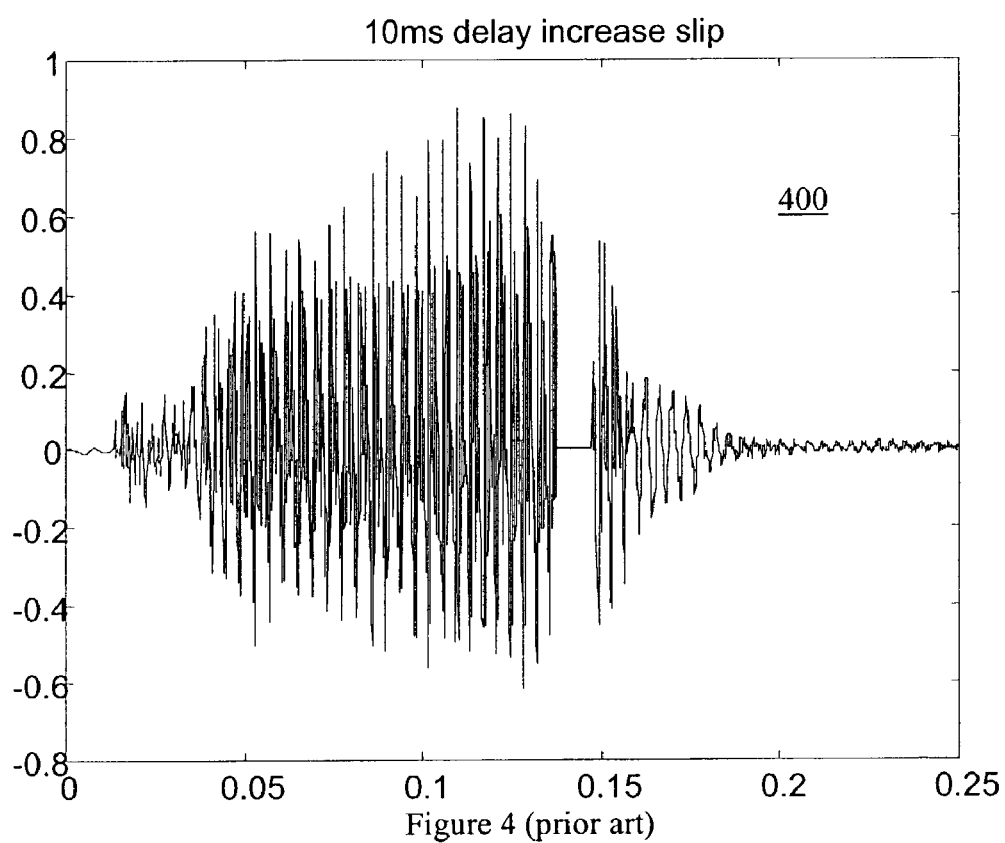
FIG. 4 is a waveform illustrating a 10 ms increase in the buffer of the system illustrated in FIG. 1.

Conversely, if play-out buffer is increased to reduce the chances of dropping packets, it is possible for gaps to occur in the reproduced signal. If the play-out buffer is changed such that a 10 ms delay increase occurs and the packets arrive slower than expected, the system may be required to wait for an incoming packet. Referring to FIG. 4, a signal reproduced under these circumstances is illustrated generally by numeral 400. As can be seen in the reproduced signal, an adjustment occurs approximately 0.13 s into the signal. The system waits for an incoming packet to arrive and thus it can be observed that the waveform suffers from the insertion of a gap of silence.

However, it is possible to adjust the play-out delay without introducing gaps or slips by increasing or decreasing the rate at which the packets are played-out. This is achieved by selectively compressing or expanding the time scale of portions of the voice signal. If delay changes do not occur very often, then the time scale change is very small and the changes in the audio are barely detectable, if at all.

Figure 5:
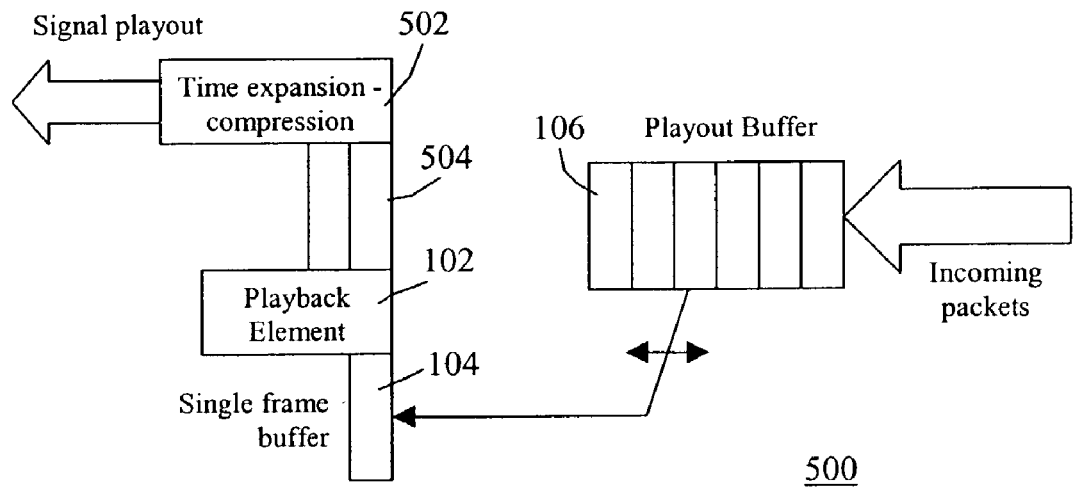
FIG. 5 is block diagram of a playback system in accordance with an embodiment of the present invention.

Referring to FIG. 5, an improved playback system is illustrated generally by numeral 500. The improved system 500 includes a playback element 102, a single frame buffer 104, and a play-out buffer 106. Additionally, the improved system 500 further includes a time adjuster 502 and a specialized buffer 504. Thus it can be seen that the proposed delay compensation improvement is an add-on to the standard set of components used in a playback system for packetized voice. The output of the playback element 102 is coupled to the specialized buffer 504, which is coupled to the time adjuster 502. The time adjuster 502 determines the rate of playback for the playback element 102.

During normal steady state operation, the specialized buffer 504 holds one or more packets of voice signal. If a delay change is limited to a single packet at a time, then the specialized buffer 504 only needs to hold a single packet of voice samples. In the present example, the specialized buffer 504 is capable of holding two packets. The time adjuster 502 determines the play-out rate of the playback element 102 in accordance with the amount of data in the specialized buffer 504. For example, if data in the specialized buffer 504 exceeds a first predefined threshold, the play-out rate of the playback element 102 is increased. Conversely, if data in the specialized buffer 504 falls below a second predefined threshold, the play-out rate of the playback element 102 is decreased.

In an alternate embodiment, rather than the time adjuster 502 determining when to adjust the play-out rate, the playback element 102 itself detects the amount of data in the specialized buffer 504 and indicates to the time adjuster 502 whether to increase or decrease the play-out rate.

The operation of the system illustrated in FIG. 5 is described as follows. The size of the play-out buffer 106 is determined as described with reference to the prior art implementation. However, in the present embodiment, the play-out buffer 106 determines how many packets to transmit to the single element buffer 104. Under normal operation circumstances, the play-out buffer 106 transmits one packet for each predefined play-out delay. The data is decompressed, if necessary, by the playback element 102 and transmitted to the specialized buffer 504. Since there is only one packet stored in the specialized buffer 504, the playback element 102 plays out the data at a standard rate.

The play-out buffer 106 monitors the status of arriving and departing packets and determines whether or not there is an excess accumulation of packets. This can happen, for example, if there is a reduction in the delay introduced by the play-out buffer 106 and packets arrive faster than expected. Once the play-out buffer 106 exceeds a predefined threshold, two or more packets are sent to the playback element 102 for each predefined play-out delay. As a result, the specialized buffer 504 holds two or more packet lengths of the signal to play-out. In reaction to the extra samples inserted into the specialized buffer 504, the time adjuster 502 compresses the playback time scale. By compressing the time scale, the module plays out more samples per unit time than under normal operation. After a period of time, the excess samples will have been played-out, and the play-out buffer 106 will have fallen below the predefined threshold. As a result, only one packet is sent to the playback element 102. The time adjuster 502 detects that there is only one packet in the specialized buffer 504 and returns to the normal time scaling.

Figure 6:
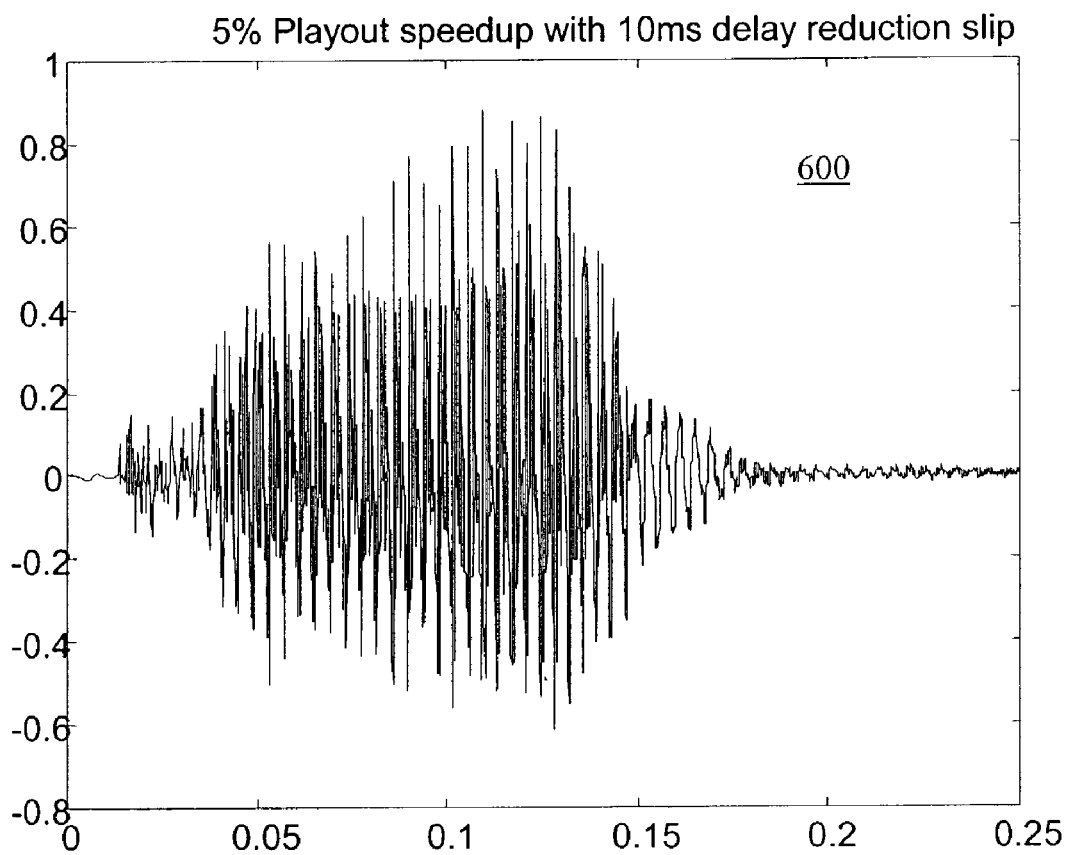
FIG. 6 is a waveform illustrating a 10 ms decrease in the buffer of the system illustrated in FIG. 5.

Referring to FIG. 6, a signal reproduced in accordance with the current embodiment of the invention having a 10 ms reduction in the delay used by the play-out buffer 106 is illustrated generally by numeral 600. The delay adjustment occurs at approximately 0.13 s time, and the time scale is compressed by five percent over a 200 ms duration. There are no visually-noticeable artifacts in the waveform 600, and listening to the sample reveals no unpleasant discontinuities.

If there is an increase in the delay of the play-out buffer 106 and packets arrive slower than expected, the playback element 102 will not receive a sufficient number of packets to cover the delay slip performed. This exhausts the specialized buffer 504 of its normal amount of accumulated packets. In the present example, the specialized buffer 504 would be empty. In reaction to the exhaustion, the time adjuster 502 expands the time scale. By expanding the time scale, the playback element 102 plays out fewer samples per unit time than it would under normal circumstances. After a period of time, the packets will start arriving at the expected rate, and the specialized buffer 504 will hold the normal number of packets, which in the present example is one. The time adjuster 502 detects that there is once again one packet of data in the specialized buffer 504 and returns to the normal time scaling.

Figure 7:
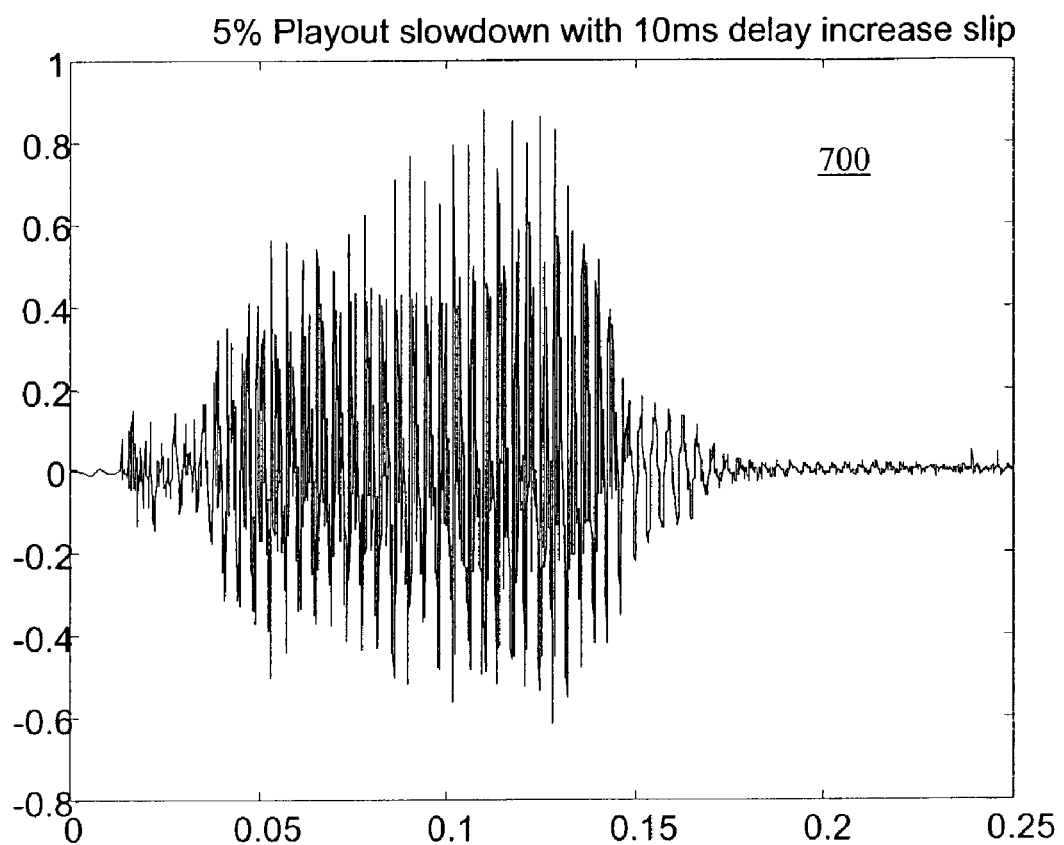
FIG. 7 is a waveform illustrating a 10 ms increase in the buffer of the system illustrated in FIG. 5.

Referring to FIG. 7, a signal reproduced in accordance with the current embodiment of the invention having a 10 ms increase in the delay used by the play-out buffer 106 is illustrated generally by numeral 700. The delay adjustment occurs at approximately 0.13 s time, and the time scale is expanded by five percent over a 200 ms duration. The silence gap that was present in the prior art (see FIG. 4) does not appear in this waveform, and there are no visually-noticeable artifacts. Listening to this sample reveals no unpleasant side effects.

A person skilled in the art will appreciate that there are many methods to adjusting the play-out rate of the playback element, and thus the time adjuster 502 need not be described in detail. Further, a person skilled in the art will appreciate that the time adjuster 502 can be implemented in various ways. In an all-digital system, a timing adjustment can be achieved through a cascade of digital interpolation and decimation. Alternately, a timing adjustment can be achieved by adjusting the playback system clock controlling the digital-to-analog conversion.

Figure 8:
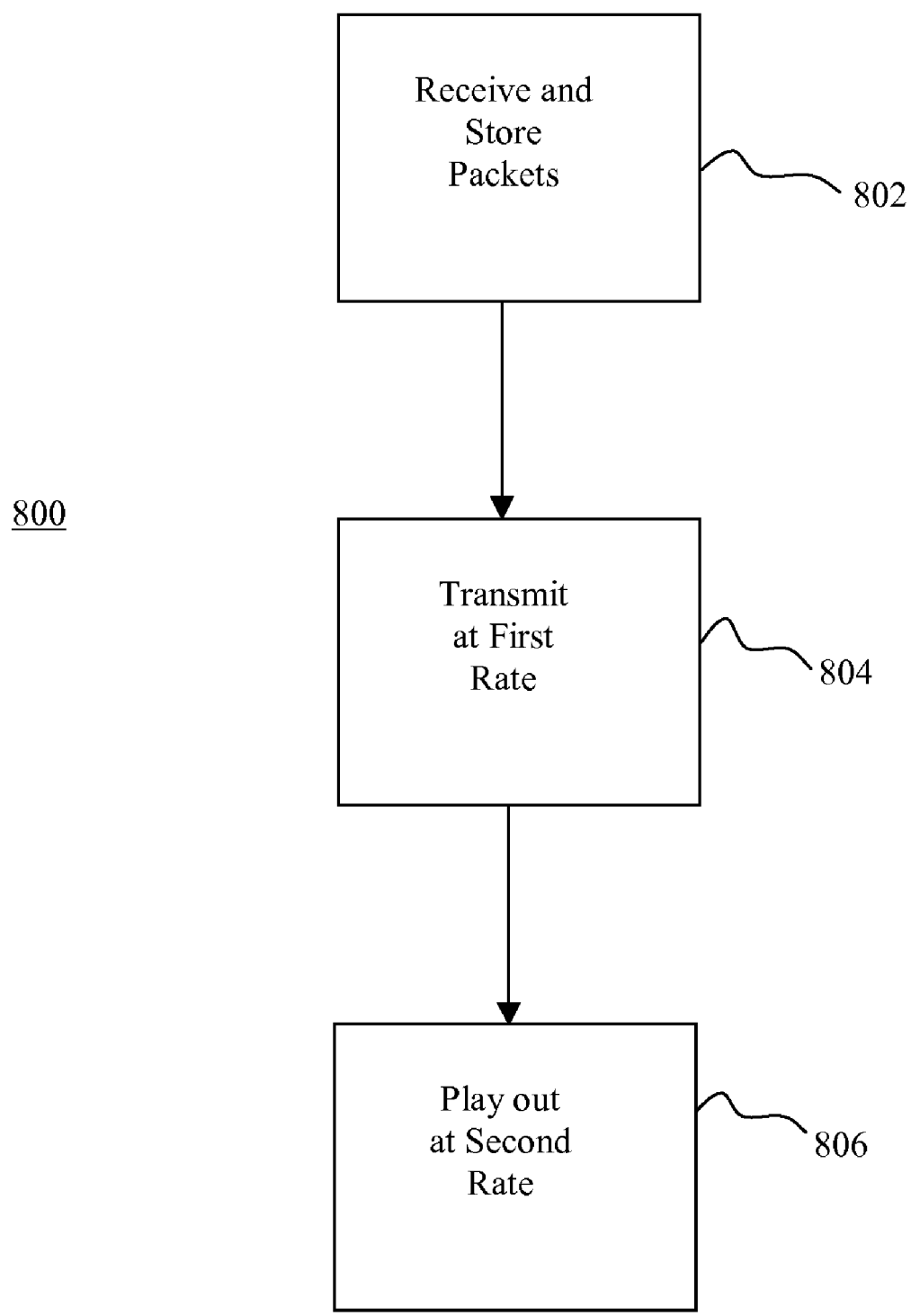
FIG. 8 is a flowchart illustrating a method according to an embodiment of the present invention.

FIG. 8 is a flowchart of a process 800 according to an embodiment of the present invention. In step 802, packets from the network are received from the network and stored in a play-out buffer. In step 804, the packets are transmitted to a playback element at a first rate in accordance with the number of packets in the play-out buffer. In step 806, the packets are played out at the playback element at a second rate in accordance with the first rate of packets transmitted from the play-out buffer. Further details of this process are as described above regarding FIG. 5.

Although the invention has been described with reference to certain specific embodiments, various modifications thereof will be apparent to those skilled in the art without departing from the spirit and scope of the invention as outlined in the claims appended hereto.

What is claimed is:

1. A system for improving a reconstruction of real-time data in a packetized network, said system comprising:
   a play-out buffer for receiving a plurality of packets from said network;
   a playback element, coupled with said play-out buffer, for receiving said plurality of packets from said play-out buffer and outputting reconstructed data packets for reconstruction of real-time data; and
   a time adjuster for altering a packet transmission rate at which said outputted reconstructed data packets are output from said playback element in accordance with an available number of said plurality of packets stored in said play-out buffer.

2. A system as defined in claim 1, wherein said time adjuster increases said packet transmission rate when a number of said plurality of packets received in said play-out buffer exceeds a predefined upper threshold.

3. A system as defined in claim 2, wherein said time adjuster returns said packet transmission rate to normal when said number of said plurality of packets falls below said predefined upper threshold.

4. A system as defined in claim 1, wherein said time adjuster decreases said packet transmission rate when a number of said plurality of packets received in said play-out buffer falls below a lower predefined threshold.

5. A system as defined in claim 4, wherein said time adjuster returns said packet transmission rate to normal when said number of said plurality of packets exceeds said predefined lower threshold.

6. A system as defined in claim 1, wherein said play-out buffer changes a number of packets transmitted to said playback element per unit of time as a number of said plurality of packets in said play-out buffer changes.

7. A system as defined in claim 6, wherein said play-out buffer increases said number of packets transmitted to said playback element per unit of time as said number of said plurality of packets in said play-out buffer exceeds a predefined upper threshold.

8. A system as defined in claim 6, wherein said play-out buffer decreases said number of packets transmitted to said playback element per unit of time as said number of said plurality of packets in said play-out buffer falls below a predefined lower threshold.

9. A method of improving reconstruction of real-time data in a packetized network, said method comprising the steps of:
   receiving a plurality of packets from said network and storing said plurality of packets in a play-out buffer;
   transmitting said plurality of packets to a playback element at a first packet transmission rate in accordance with a number of packets in said play-out buffer; and
   playing out said plurality of packets at said playback element for reconstruction of real-time data at a second packet transmission rate in accordance with said first packet transmission rate of said plurality of packets transmitted from said play-out buffer,
   wherein said first packet transmission rate is not equal to said second packet transmission rate.

10. A method as defined in claim 9, wherein said second packet transmission rate increases when said number of packets in said play-out buffer exceeds a predefined upper threshold.

11. A method as defined in claim 10, where said second packet transmission rate returns to normal when said number of packets in said play-out buffer falls below said predefined upper threshold.

12. A method as defined in claim 9, wherein said second packet transmission rate decreases when said number of packets in said play-out buffer falls below a predefined lower threshold.

13. A method as defined in claim 12, where said second packet transmission rate returns to normal when said number of said packets in said play-out buffer exceeds said predefined lower threshold.

14. A system for improving reconstruction of real-time data in a packetized network, said system comprising:
   a play-out buffer for receiving a plurality of packets from said network;
   a playback element, coupled with and downstream of said play-out buffer, for receiving said plurality of packets from said play-out buffer and outputting reconstructed data packets for said reconstruction of said real-time data and storing said outputted reconstructed data packets in a play-out output buffer; and
   a time adjuster for altering a packet transmission rate at which said reconstructed data is output from said playback element to said play-out output buffer in accordance the number of packets in said play-out output buffer.

15. A system as defined in claim 14, wherein said time adjuster increases said packet transmission rate when a number of said plurality of packets received in said play-out output buffer exceeds a predefined upper threshold.

16. A system as defined in claim 15, wherein said time adjuster returns said packet transmission rate to normal when said number of said plurality of packets in said play-out output buffer falls below said predefined upper threshold.

17. A system as defined in claim 14, wherein said time adjuster decreases said packet transmission rate when a number of said plurality of packets received in said play-out output buffer falls below a lower predefined threshold.

18. A system as defined in claim 14, wherein said play-out input buffer changes a number of packets per unit time transmitted to said playback element as a number of said plurality of packets in said play-out input buffer changes.

19. A system as defined in claim 18, wherein said play-out input buffer increases said number of packets per unit time transmitted to said playback element as said number of said plurality of packets in said play-out input buffer exceeds a predefined upper threshold.

20. A system as defined in claim 18, wherein said play-out input buffer decreases said number of packets per unit time transmitted to said playback element as said number of said plurality of packets in said play-out input buffer falls below a predefined lower threshold.

* * * * *